United States Patent Office …

3,493,490
Patented Feb. 3, 1970

3,493,490
REGENERATION OF ALUMINOSILICATE CATALYSTS
Charles J. Plank, Woodbury, and Edward J. Rosinski, Deptford, N.J., assignors to Mobil Oil Corporation, a corporation of New York
No Drawing. Filed Mar. 30, 1966, Ser. No. 538,616
Int. Cl. C10g *11/02;* B01j *11/02*
U.S. Cl. 208—120                       12 Claims

ABSTRACT OF THE DISCLOSURE

The invention is directed to the discovery that crystalline aluminosilicate catalysts whose activity has been diminished by exposure to moisture, high temperatures, and to moisture at high temperatures may be restored by controlled treatment with anionic reagents.

---

This invention is concerned with the use of highly active crystalline aluminosilicate catalytic materials in hydrocarbon conversions. In particular, it is concerned with the adjustment of the activity of such catalysts, and with their rejuvenation after lowering of their activity resulting from exposure to moisture, to high temperatures, and to moisture at high temperatures.

Highly active crystalline aluminosilicate catalysts are prepared by the insertion of selected cationic materials in controlled amounts into the crystalline structure of selected aluminosilicates, replacing alkali metal cations, as described in Plank, et al., U.S. Patent 3,140,249; Plank, et al., U.S. Patent 3,140,251; Frilette, et al., U.S. Patent 3,140,252; Clark et al., U.S. Patent 3,140,252; Frilette et al., U.S. Patent 3,140,322 and others. A more detailed discussion of such preparation is given later herein.

Such catalytic materials are useful for the cracking of hydrocarbons, and for use in many operations conducted by reaction in the presence of acidic catalyst sites. In cracking, one desires a relatively high conversion, with relatively high production of gasoline and relatively low production of coke and gases. In such hydrocarbon conversions as the alkylation of paraffins, the isomerization of paraffins and cycloparaffins, the polymerization of olefins, the alkylation and dealkylation of aromatics, the disproportionation of aromatics and the like, a catalyst considerably more active than useful for cracking is usually desired.

A cracking catalyst, regenerated by combustion, encounters moisture at high temperature, and prolonged cyclic use tends to lower the activity of the catalyst by such exposure to moisture.

In many acidic site reactions, the conversion is accompanied by the formation of water, and in any regeneration of catalytic materials containing hydrocarbon deposits by burning, moisture is present at high temperatures, leading to loss of activity.

This invention is directed to the discovery that the activity of such catalytic materials which has been lessened by such exposures may be restored by a controlled treatment with anionic reagents. Among anionic reagents so useful, there may be mentioned liquid water at high temperature, and materials containing anions capable of complexing with polyvalent cations, as will later appear.

A typical crystalline aluminosilicate may be represented by the formula:

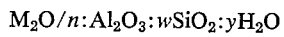

Where M is a cation of valence $n$ which balances the electrovalence of the crystalline structure, $w$ is the moles of $SiO_2$, and $y$ the moles of $H_2O$. The proportions of the inorganic oxides in the aluminosilicate may vary, as may their spatial arrangement, effecting distinct properties, although two main characteristics of the materials persist. These are the presence in the molecular structure of at least 0.5 and preferably at least 0.8 equivalents of an anion of positive valence per gram atom of aluminum, and an ability to undergo dehydration without substantially affecting the $SiO_2$ and $Al_2O_3$ framework.

Various such aluminosilicates, both natural and synthetic exist, and for catalytic conversions of hydrocarbons, those ranging from pore sizes of 5 A. upwards to 13 A. or so are preferred, dependent upon the spectrum of hydrocarbon sizes to be accepted for conversion.

Typical of such materials are the synthetic sodium form of the X aluminosilicate, which may be represented as follows:

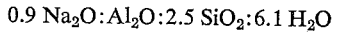

and also "Zeolite Y," the sodium form of which may be represented as:

wherein $w$ has a value greater than 3, and $x$ may have a value up to about 9. Both materials have the crystalline form of faujasite.

Catalytic materials of high activity, good stability, and excellent selectivity may be prepared from these materials. The course of preparation is by the introduction of selected cations into the crystalline structure, preferably by base exchange, followed by thorough washing, drying, and dehydrating to activate. Initially so prepared, the materials are so extremely active that when used in cracking they give a very high production of coke relative to gasoline. They are adjusted downward in activity to a useful level by steaming or calcining.

These catalysts may be characterized as having been derived from aluminosilicates having a highly ordered crystalline structure characterized by pores having openings of uniform sizes within the range greater than 4 and less than 15 angstroms, preferably between 6 and 15 angstroms, the pore openings being sufficiently large to admit the hydrocarbon to be converted. The preferred crystalline aluminosilicates will have a rigid three-dimensional network characterized by a system of cavities and interconnecting ports or pore openings, the cavities being connected with each other in three dimensions by pore openings or ports which have minimum diameters of greater than 6 angstrom units and less than 15 angstrom units.

A specific typical example of such a structure is that of the mineral faujasite.

These aluminosilicates will be treated to replace all or a substantial portion of the alkali metal cations with other cations, primarily metal cations, or hydrogen, or mixtures of such cations. For cracking reactions, replacement by rare earth metal cations is preferred. A full discussion of such catalysts is to be found in Plank, et al., U.S. Patent 3,210,267.

That patent further discusses the use of such materials with a diluent material of lesser or little activity, and points out that for cracking, a characterizing amount of the highly active material in such mixtures will range from about 2 to about 25 percent. For other uses, where high catalyst activity is desirable, the proportion of highly active material may range in some cases up to about 90%.

Two methods of testing the ability and activity of catalysts will be described.

The first one, roughly parallel to commercial cracking, and designed to test the fitness of catalyst for such operation, is a fixed bed reaction. It is conducted at 900° F. for a period of ten minutes on stream, at a liquid hourly space velocity (LHSV), i.e., volume of charge, measured at 60° F. per hour per unit volume of catalyst in reactor, of 16, and a catalyst to oil ratio (C/O), i.e., volumes of catalyst per hour per unit volume of oil, of 0.38. Desirable criteria for a good commercial catalyst for cracking are a relatively high conversion, with high gasoline production and relatively low levels of production of coke and gases. Those familiar with such a test know that a relatively high ratio of coke production to gasoline production indicates that the catalyst is too active, and will usually achieve only low conversion because of rapid degradation of the catalyst by coke accumulation.

The second method is the hexane cracking activity test, described in Journal of Catalysts, vol. 4, No. 4, pages 527–529, wherein a continuous flow microreactor is used to determine relative activities of catalysts. In this test n-hexane is passed over a small amount of catalyst contained in the microreactor, and the products of cracking are measured by gas chromatography. The conditions are as follows:

| | |
|---|---|
| Catalyst volume in reactor _____ cc__ | 1.5 |
| n-hexane flow rate _____ cc./hr__ | 0.66 |
| LHSV _____ | 0.44 |
| Catalyst/hexane ratio _____ | 46 |
| Temperature, Deg. F., selected _____ | 600–1000 |

The products of conversion are taken after 5 minutes on stream and chromatographically analyzed. The relative activity is expressed as "alpha."

Alpha-1 for a standard amorphous silica alumina catalyst used in cracking, giving 13% conversion in above test at 1000° F.

This test is highly useful in that it is more indicative of intrinsic catalytic activity, since catalyst deactivation by side reaction such as coke formation is minimized. It is particularly indicative of usefulness for many of the acidic site reactions noted herein.

EXAMPLE 1

A catalyst was prepared by adding 0.5 wt. percent of a wetting agent, (Marasperse), to 75 pounds, (dry basis at 650° F.), of zeolite X wet cake, then base exchanging semicontinuously in a 3 stage contactor with a combined solution (aqueous), of 5 wt. percent $RECl_3:6H_2O$ and 2 wt. percent of $NH_4Cl$ for 24 hours. This combined solution was charged at a rate of 1577 cc. of solution per minute while the slurry was maintained at 180° F. during the exchange period. The slurry, containing 20 wt. percent of solids was filtered once every hour and then reslurried for the semi-continuous exchanging. The exchanged X aluminosilicate was washed clear of chloride ions at 180° F. and dried at 230° F. in air for 20 hours. The final sodium content was 0.22 wt. percent. The material was then pelletted and sized to 4 to 10 U.S. Standard mesh. The pelletted material was calcined for 10 hours at 1000° F. This was used as the starting material for many of the following studies.

Catalytic evaluation of this unsteamed catalyst is presented in Table I. The data show clearly that the activity is excessive for operation under any conditions approaching conventional catalytic cracking operation. So much coke is formed that the catalyst is deactivated before it can give a good degree of conversion. When subjected to the hexane cracking test, this material would have an alpha of approximately 5000.

EXAMPLE 2

The catalyst of Example I was steam treated for 24 hours at 1200° F. and 15 p.s.i.g., 100% steam to reduce its too high activity to a level useful in cracking. The data from Table I show the steamed catalyst to have an excellent activity (65.4% conversion at 16 LHSV and 0.38 C/O), and a selectivity advantage of +7.1% (vol.) of $C_5+$ gasoline yield over a conventional amorphous silica alumina catalyst at the same conversion level.

When subjected to the "alpha test" for hexane conversion, this steamed catalyst was found to be more than five times more active (alpha-5), than the conventional amorphous silica alumina cracking catalyst.

EXAMPLE 3

This example shows the reversal that takes place in the activity of the steamed catalyst of Example 2 as the result of a hydrothermal treat at 400 F. with steam in the presence of excess, liquid water. The hydrothermal treat was accomplished by charging the catalyst to an autoclave along with excess water, heating the system under pressure up to 400° F. holding at that temperature for one hour, then allowing the autoclave to cool to room temperature overnight.

The reversal effect is evident in the greatly increased coke make relative to the very low conversion in the fixed bed test, parallel to the performance of Example 1. It is also shown in the high hexane conversion (66.3% at 700° F.), shown in the alpha test. This gives an alpha value of 1000, that is, the catalyst of Example 3 is 1000 times more active than the standard amorphous silica alumina catalyst. Comparing the alpha tests for catalysts of Example 2 and Example 3, it is seen that the activity was increased from 0.5% conversion of hexane for the steamed catalyst to 66.3% for the hydrothermally treated catalyst.

This result is wholly unexpected, since it has been deemed that the degradation of activity of catalysts by exposure to a moist atmosphere at high temperature, as by steaming, is not reversible, and that once degraded, activity could not be restored.

EXAMPLE 4

The catalyst of Example 3 was resteamed under mild conditions (20 hours steam treat at 1225° F. with steam at atmospheric pressure). Fixed bed catalytic activity data in Table I show that the properties of this catalyst approach those of the original steamed catalyst of Example 2. The return to the initial steamed status is also evident from the alpha, or hexane cracking test, showing a conversion of 9.8% for an alpha value of 11 as compared to 1 for the standard amorphous silica alumina.

EXAMPLE 5

The catalyst of Example 4 was resteamed at more severe conditions (24 hours at 1200° F., 15 p.s.i.g., 100% steam), and shows a continued improvement in selectivity, as well as in gasoline production relative to the standard amorphous silica alumina cracking catalyst at the same conversion level.

The data of the above examples, set forth in Table I, demonstrate that the degradation effect of steam at high temperature can indeed be reversed, and that a rejuvenation of a catalyst of activity so lowered can be accomplished by the treatment indicated. While the steam treatments so far shown are only those normally utilized to adjust the activity of these catalysts to a value useful for catalytic cracking, it is well known that such treatment, carried out more extensively, will reduce the activity still further, quite parallel to the lessening of activity experienced by similar exposure to moist atmospheres at high temperatures, such as occur in the cyclic reaction and regeneration systems of catalytic cracking, and the data recited show the practicability of rejuvenation of catalyst so lessened in activity.

TABLE I

| Example | 1 | 2 | 3 | 4 | 5 |
|---|---|---|---|---|---|
| Catalytic evaluation: | | | | | |
| Temp., deg. F | 900 | 900 | 900 | 900 | 900 |
| LHSV | 16 | 16 | 16 | 16 | 16 |
| C/O | 0.38 | 0.38 | 0.38 | 0.38 | 0.38 |
| Conversion (vol. percent) | 44.0 | 65.4 | 18.7 | 59.7 | 58.6 |
| $C_5$+Gaso. (vol. percent) | 28.4 | 52.3 | 7.2 | 47.3 | 49.2 |
| Total $C_4$s (vol. percent) | 11.9 | 14.7 | 7.3 | 13.6 | 11.6 |
| Dry Gas (wt. percent) | 6.8 | 6.5 | 4.7 | 6.6 | 5.2 |
| Coke (wt. percent) | 4.7 | 3.2 | 3.3 | 2.7 | 2.6 |
| Gasoline efficiency | 64.5 | 80.0 | 38.5 | 79.3 | 83.8 |
| Wt. percent coke divided by vol. percent $C_5$ Gaso | 0.165 | 0.061 | 0.455 | 0.057 | 0.053 |
| Delta advantage over Std. Si/Al: | | | | | |
| $C_5$+Gaso. (vol. percent) | −5.0 | +7.1 | | +5.1 | +7.5 |
| Total $C_4$s (vol. percent) | +1.0 | −3.5 | | −2.5 | −4.2 |
| Dry Gas (wt. percent) | +1.2 | −2.0 | | −1.1 | −2.3 |
| Coke (wt. percent) | +2.2 | −2.2 | | −1.8 | −1.7 |
| Hexane cracking activity: | | | | | |
| Conversion at 700 F | | 0.5 | 66.3 | 9.8 | |
| Alpha (ratio to Si/Al=1) | 5,000 | 5 | 1,000 | 11 | |

NOTE.—Gasoline efficiency=C gasoline divided by conversion, times 100. Delta advantage figures show the difference in product yields from a standard amorphous silica alumina cracking catalyst at the same level of conversion, and are used herein as a basis for comparison of the various examples.

It must be noted that the catalytic activity test is designed primarily for determining the suitability of a catalyst for catalytic cracking. While the data indicate that materials of Examples 1 and 3 are not so suitable, the results from these two examples must be regarded in a positive sense, since they clearly show a very high level of activity. This showing is clearly reinforced by the data on hexane cracking activity and alpha evaluation. In particular, comparison of Examples 1, 2, and 3 show that a catalyst of initial high activity, reduced in activity by steaming, as in Example 2, may be restored by the treatment described to an extremely high activity, quite suitable for hydrocarbon conversions requiring an acidic catalyst of high activity.

The teaching set forth in the data of Table I is that materials lessened in activity by exposure to moisture at high temperature may be returned to high activity by suitable treatment with an anionic agent.

EXAMPLE 6

In this example, the material of Example 1, already calcined for 10 hours at 1000° F., was repelleted and calcined in air for 10 hours at 1300° F., and then steamed for 24 hours at 1200° F., 15 p.s.i.g., 100% steam. Its catalytic evaluation is shown in Table II.

EXAMPLE 7

The material of Example 6 was treated with a 10% solution of $NH_4OH$ as the anionic reagent at 200° F. for 24 hours, resulting in the production of a catalyst of rapid coking rate, low selectivity and low conversion.

EXAMPLE 8

Treating the material of Example 7 with steam at 1200° F., 15 p.s.i.g., 100% steam, for 24 hours, is shown to re-establish catalytic cracking competence.

TABLE II

| Example | 6 | 7 | 8 |
|---|---|---|---|
| Catalytic evaluation: | | | |
| Temp., ° F | 900 | 900 | 900 |
| LHSV | 16 | 16 | 16 |
| C/O | 0.38 | 0.38 | 0.38 |
| Conversion (vol. percent) | 65.8 | 36.9 | 61.4 |
| $C_5$+ gasoline (vol percent) | 52.9 | 24.2 | 50.9 |
| Total $C_4$s (vol. percent) | 13.9 | 10.5 | 12.7 |
| Dry Gas (wt. percent) | 6.7 | 5.7 | 5.7 |
| Coke (wt. percent) | 3.4 | 3.4 | 2.5 |
| Delta advantage over std. Si/Al: | | | |
| $C_5$+ gasoline (vol. percent) | +7.5 | −4.8 | +7.8 |
| Total $C_4$s (vol. percent) | −4.4 | +2.2 | −4.1 |
| Dry Gas (wt. percent) | −1.9 | +1.1 | −2.3 |
| Coke (wt. percent) | −2.1 | +1.1 | −2.2 |
| Alpha value | ±5 | 37 | |

EXAMPLE 9

In this example, a commercial catalyst, ready for use in catalytic cracking, was used. The catalyst was composed of about 7.5% of rare earth exchanged zeolite X dispersed in a matrix of amorphous silica alumina cracking catalytic material.

The catalyst composite was steamed for 24 hours at 1200° F., 15 p.s.i.g., 100% steam, and was observed to undergo a degradation of activity quite comparable to that found after reasonable exposure in a cyclic cracking process of cracking and regeration.

The catalyst of degraded activity was treated by contacting with a 20.8% ammonium hydroxide solution prepared by diluting 344 gm. $NH_4OH$, (29.1 $NH_3$), with 656 gm. of water. Several contact times of different duration, ranging from 1 hour to 16 hours were used, and in each case 160 cc. of the steamed catalyst was contacted with 160 cc. of the $NH_4OH$ solution of 200° F. After such contacting the catalyst was washed, dried for 20 hours at 270° F., and then calcined for 10 hours at 1000° F. in air.

The original commercial catalyst, the degraded catalyst, and rejuvenated samples were tested by the hexane cracking procedure previously described. The results are shown below.

TABLE III

| Description | Percent (vol.) hexane conversion | |
|---|---|---|
| | At 1,000° F | Alpha |
| Commercial catalyst, new | 13.2 | 1.0 |
| Same, steam deactivated | 4.5 | 0.33 |
| Deact. Cat., 1 hr. $NH_4OH$ Treat | 31.9 | 2.7 |
| Deact. Cat., 5 hr. $NH_4OH$ Treat | 17.6 | 1.35 |
| Deact. Cat., 16 hr. $NH_4OH$ Treat | 11.9 | 0.9 |

The data of the above table show clearly that a commercial catalyst comprising highly active crystalline aluminosilicate, which catalyst has been lowered in activity by exposure to moist atmospheres at high temperatures in a cyclic process comprising reaction and regeneration, may be restored to excellent activity by treatment with an anionic reagent as set forth herein.

In studying the above data it must be remembered that the matrix of amorphous silica alumina, making up the bulk of the catalyst, had only an alpha of about 1 to start with, and the steam treatment degraded it to a still lower value, and, moreover, that its activity loss is not reversible.

EXAMPLE 10

In this example, a similar base exchange operation was carried out with zeolite X, except that an aqueous solution of the hexahydrate of lanthanum chloride was used instead of the solution of hexahydrates of mixed rare earth chlorides. The product has the following analysis:

Wt. percent
Na _____ 0.24
$La_2O_3$ _____ 29.6
$Al_2O_3$ _____ 27.2
$SiO_2$ _____ 40.3

This material was steamed for 48 hours at 1200° F., 15 p.s.i.g., 100% steam, and gave a catalyst of excellent activity and selectivity, as shown in Table IV.

EXAMPLE 11

The steamed catalyst of Example 10 was hydrothermally treated for one hour, at 400° F. in the presence of liquid water, and allowed to cool overnight. When catalytically tested, as shown in Table IV, it was found to have increased in activity to a point where coke buildup was so rapid as to prevent competent conversion.

TABLE IV

| Example | 10 | 11 |
|---|---|---|
| Catalytic evaluation: | | |
| Temp., deg. F | 900 | 900 |
| LHSV | 16 | 16 |
| C/O | 0.38 | 0.38 |
| Conversion (vol. percent) | 69.1 | 35.9 |
| C₅+ gasoline (vol. percent) | 55.0 | 22.7 |
| Total C₄s (vol. percent) | 15.6 | 10.1 |
| Dry gas (wt. percent) | 6.8 | 5.7 |
| Coke (wt. percent) | 3.7 | 4.2 |
| Delta advantage over std. Si/Al: | | |
| C₅+ gasoline (vol. percent) | +8.0 | −5.5 |
| Total C₄s (vol. percent) | −4.0 | +2.1 |
| Dry Gas (wt. percent) | −2.3 | +1.2 |
| Coke (wt. percent) | −2.4 | +2.6 |

EXAMPLES 12 AND 13

In this experimentation, a zeolite Y type of faujasite was used. It was treated by base exchange with an aqueous solution containing 5 wt. percent of hexahydrates of rare earth chlorides, and 5 wt. percent of ammonium chloride, exposing the crystalline aluminosilicate to 180 pounds of this solution per two pounds, of aluminosilicate over a period of 6 days. The product, washed and dried, analyzed 12.6 wt. percent of rare earth, calculated as $RE_2O_3$. For Example 12, the product was steamed 24 hours, 1200° F., 15 p.s.i.g., 100% steam, for Example 13, the steamed material of Example 12 was hydrothermally treated at 400° F. for one hour in the presence of liquid water and allowed to cool overnight. Both were subjected to catalytic cracking evaluation.

The data from the evaluation, shown in Table V, indicates that the material of Example 12 is an excellent cracking catalyst, while the data for Example 13 show a material so active that the rapid buildup of coke prevents proper conversion and selectivity, when used in cracking, but quite suitable for reactions calling for high activity.

TABLE V

| Example | 12 | 13 |
|---|---|---|
| Catalytic evaluation: | | |
| Temp., deg. F | 900 | 900 |
| LHSV | 16 | 16 |
| C/O | 0.38 | 0.38 |
| Conversion (vol. percent) | 68.0 | 43.6 |
| C₅+ gasoline (vol. percent) | 59.0 | 31.9 |
| Total C₄s (vol. percent) | 13.8 | 11.1 |
| Dry gas (wt. percent) | 5.9 | 5.5 |
| Coke (wt. percent) | 1.7 | 2.7 |
| Delta advantage over std. Si/Al: | | |
| C₅+ gasoline (vol. percent) | +12.7 | −1.1 |
| Total C₄s (vol. percent) | −4.9 | +0.5 |
| Dry gas (wt. percent) | −2.8 | 0.0 |
| Coke (wt. percent) | −4.4 | +0.4 |

In the examples cited thus far the anionic reagent has been the hydroxyl ion, as indicated by the comparable results with liquid water under hydrothermal conditions and NH₄OH under milder conditions.

Similar effects can be had with anions other than hydroxyl ions, as shown by the paired examples of the following group.

EXAMPLES 14-15, 16-17, AND 18-19

These examples were gotten by treatment of a steamed rare earth exchanged catalyst of the same nature as that shown in Example 2.

For Example 14, the catalyst was treated for 24 hours at 200° F. with a 1% solution of acetic acid (pH 2.9), to give a catalyst of high activity, as indicated by its ratio of coke production to gasoline production. Upon resteaming, for Example 15, at 1200° F., 15 p.s.i.g., 100% steam, 24 hours, the activity was reduced.

For Example 16, the reagent was a 1% solution of hydrochloric acid (pH 1.3), applied for 24 hours at 200° F. Resteaming was conducted as in Example 15.

For Example 18, the reagent was a saturated solution of $CO_2$ (pH 6.1) applied for 24 hours at 200° F. For Example 19, resteaming was conducted as in Examples 15 and 17.

TABLE VI

| Example | 14 | 15 | 16 | 17 | 18 | 19 |
|---|---|---|---|---|---|---|
| Catalytic evaluation: | | | | | | |
| Temp., deg. F | 900 | 900 | 900 | 900 | 900 | 900 |
| LHSV | 16 | 16 | 16 | 16 | 16 | 16 |
| C/O | 0.38 | 0.38 | 0.38 | 0.38 | 0.38 | 0.38 |
| Conversion (vol. percent) | 54.1 | 64.3 | 59.7 | 64.9 | 53.0 | 58.8 |
| C₅+ Gaso. (vol. percent) | 41.2 | 52.7 | 45.7 | 54.1 | 40.2 | 48.6 |
| Total C₄s (vol. percent) | 12.5 | 13.8 | 14.3 | 14.5 | 12.6 | 12.2 |
| Dry gas (wt. percent) | 6.1 | 6.2 | 6.9 | 5.3 | 6.3 | 5.6 |
| Coke (wt. percent) | 3.9 | 2.7 | 3.6 | 2.5 | 3.4 | 2.6 |
| Delta advantage over std. Si/Al: | | | | | | |
| C₅+ gaso. (vol. percent) | +1.9 | +8.1 | +3.4 | +9.2 | +1.6 | +6.7 |
| Total C₄s (vol. percent) | −1.6 | −3.9 | −1.8 | −3.4 | −1.1 | −3.5 |
| Dry gas (wt. percent) | −0.9 | −2.3 | −1.0 | −3.2 | −0.5 | −2.1 |
| Coke (wt. percent) | +0.4 | −2.5 | −0.8 | −2.8 | 0.0 | −1.6 |

Thus, each of these rather mild anionic treatments is seen to achieve the same kind of activity increase as in previous examples, as shown by the criteria previously discussed.

The examples heretofore presented employ crystalline aluminosilicates which have been base exchanged to place within their crystalline system rare earth ions in place of the alkali metal ions originally present, in one case, Example 12 using hydrogen ion in addition. The phenomenon discussed is not restricted to such materials. This is demonstrated by Examples 20 to 25. One pair of examples uses a Y type faujasite in the acid form, a second pair uses a magnesium base-exchanged Y type faujasite, and the third pair shows a Y type material in the form of an ammonium salt, and in another the reagent in ammonium hydroxide.

EXAMPLES 20 AND 21

In Example 20, the catalytic material is an "acid" Y type faujasite, prepared by base exchanging with ammonium chloride to a sodium content of 0.69 wt. percent followed by washing, drying, and steaming for 24 hours at 1200° F., 15 p.s.i.g., 100% steam, to prepare a catalyst quite competent for commercial cracking.

In Example 21, the material of Example 20 was treated with a 10% solution of ammonium oxalate, (100 cc. of solution per 40 cc. of catalyst), for 24 hours at 180° F., followed by washing with 200 cc. of water, drying in air at 230° F., for 24 hours, and calcining for 10 hours at 1000° F. in air. The activity of the catalyst was greatly increased and its selectivity was reduced.

EXAMPLES 22 AND 23

The starting material in this group was a Y type faujasite in which the cationic material was magnesium, introduced by base exchange to the extent that the remaining alkali metal content was 0.66 wt. percent of sodium. This material was washed, dried 20 hours at 270° F. and steamed for 24 hours at 1200° F., 15 p.s.i.g., 100% steam, to yield a commercially competent cracking catalyst.

In Example 23, the material of Experiment 22, above, in the amount of 50 cc., was treated with 100 cc. of a 10 wt. percent solution of NH₄OH for 24 hours at 180° F. After washing with 200 cc. of water, it was dried at 230° F. in air, and calcined for 10 hours at 1000° F. in air.

EXAMPLES 24 AND 25

The catalytic material used in these examples was a Calcium-Acid Y type faujasite, containing 4.61 wt. percent of calcium, the residual alkali metal, sodium, amounting to 0.35 wt. percent.

For Example 24, it was steamed for 24 hours at 1200° F., 15 p.s.i.g., 100% steam, to yield a commercially competent cracking catalyst.

For Example 25, this material was treated with 100 cc. of a 10% solution of ammonium phosphate per 32 cc. of catalyst for 24 hours at 180° F., washed with 200 cc. of water, dried at 230° F. for 24 hours, and calcined for 10 hours at 1000° F. in air.

TABLE VII

| Example | 20 | 21 | 22 | 23 | 24 | 25 |
|---|---|---|---|---|---|---|
| Catalytic evaluation: | | | | | | |
| Temp., deg. F | 900 | 900 | 900 | 900 | 900 | 900 |
| LHSV | 16 | 16 | 16 | 16 | 16 | 16 |
| C/O | 0.38 | 0.38 | 0.38 | 0.38 | 0.38 | 0.38 |
| Conversion (vol. percent) | 42.2 | 26.8 | 53.2 | 27.8 | 62.0 | 49.7 |
| $C_5+$ gaso. (vol. percent) | 38.0 | 19.7 | 48.5 | 23.4 | 56.2 | 36.8 |
| Total $C_4$s (vol. percent) | 7.8 | 6.4 | 8.9 | 5.1 | 10.6 | 12.6 |
| Dry gas (wt. percent) | 3.4 | 3.6 | 3.9 | 3.0 | 4.4 | 6.1 |
| Coke (wt. percent) | 0.5 | 1.7 | 1.0 | 1.2 | 1.1 | 2.9 |
| Delta advantage over std. Si/Al: | | | | | | |
| $C_5+$ gaso. (vol. percent) | +5.9 | | +9.8 | | +12.7 | −9.3 |
| Total $C_4$s (vol. percent) | −2.3 | | −4.9 | | −6.3 | +4.6 |
| Dry gas (wt. percent) | −1.9 | | −3.0 | | −3.7 | +2.6 |
| Coke (wt. percent) | −1.7 | | −2.4 | | −3.7 | +2.2 |
| Alpha activity | ¹10 | ²25 | | | ¹1 | ²25.5 |

¹ Approx. ² Above.

It is readily apparent from the examples that the treatment with an anionic reagent is capable of restoring high activity to a catalyst material comprising crystalline aluminosilicate which has been activated by incorporating within its structure selected cations, and which has then been decreased in activity by exposure to high temperatures or, more usually to high temperatures in the presence of moisture. Such degradation of activity has heretofore been thought to be irreversible.

It is to be noted that in the case of the hydrothermal treatment in the presence of liquid water, the action is quite distinct from similar treatment of amorphous silica alumina materials. This may be noted by comparison of the data of this application with that of Gilbert, U.S. Patent 2,982,719, or of Plank, U.S. Patent 2,698,305. In each of these, treatment with steam at high temperatures and in pressure ranges where liquid water would be present resulted in a decrease of gasoline producing activity, accompanied by a decrease in coke production such that the gasoline/coke ratio increased materially. Here, the action of the anionic reagent is the reverse, as may be seen from the examples of Table I.

The anionic reagents which may be used are in general those which possess anions capable of complexing with polyvalent cations. Among those having hydroxyl anions may be noted liquid water, ammonium hydroxide, and other hydroxyl containing materials of similar activity. Other anionic reagents include the organic and inorganic compositions of anions such as the carboxylates and dicarboxylates, and compounds of inorganic oxyanions such as phosphates, sulphates, and the like. It should be noted that no anionic reagent should contain alkali metal as the cationic ingredient.

With such a range of reagents of varying activity, it is to be noted that the conditions of treatment will also vary widely. A general guide may be given, however, in that treatment with strong reagents, such as strongly acidic materials, treatment at high temperatures, and prolonged treatment may be found to cause deterioration of the crystalline structure of catalyst material and should be avoided.

We claim:

1. That process for the cracking of hydrocarbons which comprises subjecting the hydrocarbons to cracking conditions of temperature and time in the presence of a contact mass containing a characterizing amount of a crystalline aluminosilicate into the crystalline structure of which there have been placed activating cations until the activity of the crystalline aluminosilicate catalyst has been decreased, then removing the catalyst from the reaction system and treating it with an anionic reagent selected from the group consisting of liquid water at a temperature above 212° F. and a solution containing a hydroxyl ion from a non-alkali-metal compound to restore its activity.

2. The process of claim 1 in which the activity of the catalyst of restored activity is further adjusted by steaming.

3. The process of claim 1 in which the anionic reagent is one capable of complexing with polyvalent cations.

4. The process of claim 1 in which the anionic reagent is one possessed of hydroxyl cations capable of complexing with polyvalent cations.

5. The process of claim 1 in which the anionic reagent is ammonium hydroxide.

6. The process of claim 1 in which the anionic reagent is selected from the group consisting of carboxylates and dicarboxylates and compounds of inorganic oxyanions.

7. That process for restoration of the activity of a crystalline aluminosilicate catalyst into the crystalline structure of which there have been placed activating cations the activity of such catalyst having been lessened in a hydrocarbon conversion process which comprises: treating the catalyst with an anionic reagent selected from the group consisting of liquid water at a temperature above 212° F. and a solution containing a hydroxyl ion from a non-alkali-metal compound.

8. The process of claim 7 in which the anionic reagent is one capable of complexing with polyvalent cations.

9. The process of claim 7 in which the anionic reagent is one possessed of hydroxyl ions capable of complexing with polyvalent cations.

10. The process of claim 7 in which the anionic reagent is ammonium hydroxide.

11. The process of claim 7 in which the anionic reagent is selected from the group consisting of carboxylates and dicarboxylates and compounds of inorganic oxyanions.

12. As a catalyst for hydrocarbon conversion, a crystalline aluminosilicate into the crystalline structure of which there have been placed activating cations, which catalyst has been reduced in activity in a hydrocarbon conversion reaction, and which has subsequently been reactivated by treatment with an anionic reagent selected from the group consisting of liquid water at a temperature above 212° F. and a solution containing a hydroxyl ion from a non-alkali-metal compound.

References Cited

UNITED STATES PATENTS

| 3,033,778 | 5/1962 | Frilette et al. | 208—120 |
|---|---|---|---|
| 3,239,471 | 3/1966 | Chin et al. | 252—455 |
| 2,908,639 | 10/1959 | Carter et al. | 208—310 |
| 2,962,435 | 11/1960 | Fleck et al. | 208—119 |
| 3,075,023 | 1/1963 | Garrison et al. | 260—676 |
| 3,238,120 | 3/1966 | Sale | 208—111 |
| 3,210,267 | 10/1965 | Plank et al. | 208—120 |
| 3,364,135 | 1/1968 | Hansford | 208—120 |

HERBERT LEVINE, Primary Examiner

U.S. Cl. X.R.

252—412, 420, 455

PO-1050
(5/69)

UNITED STATES PATENT OFFICE
CERTIFICATE OF CORRECTION

Patent No. 3,493,490             Dated  February 3, 1970

Inventor(s)   Charles J. Plank and Edward J. Rosinski

It is certified that error appears in the above-identified patent and that said Letters Patent are hereby corrected as shown below:

Column 1, line 34, delete "Clark et al., U.S. Patent 3,140,252" and insert in lieu thereof --Plank et al., U.S. Patent 3,140,253--.
Column 3, line 27, "Catalysts" should be --Catalysis--.
Column 4, line 32, "700°E." should be --700°F.--.
Column 6, line 19, the second "of" should be --at--.
Column 8, line 34, the second "in" should be --is--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents